3,763,135
GAMMA GLOBULIN PRODUCTION FROM COHN FRACTION III USING POLYETHYLENE GLYCOL
Edward Shanbrom, Santa Ana, Martha B. Hainski, Glendale, and John H. Payne, Los Angeles, Calif., assignors to Baxter Laboratories, Inc., Morton Grove, Ill.
No Drawing. Filed Nov. 8, 1971, Ser. No. 196,749
Int. Cl. C07g 7/00
U.S. Cl. 260—112 B                2 Claims

ABSTRACT OF THE DISCLOSURE

The method of preparing a gamma globulin concentrate in high yield and purity and suitable for intravenous administration consisting of the multiple fractionation of Cohn Plasma Fraction III with polyethylene glycol 4,000 at a series of predetermined increasing concentrations and under selected pH conditions.

---

This invention relates to a method for the production of gamma globulin. More particularly, this invention relates to an improved method for the preparation of a chemically unmodified gamma grobulin concentrate suitable for intravenous administration.

The isolation and purification of gamma globulin is of considerable importance to medical science and, particularly, for the production of immunizing preparations. This separation procedure is desirable because many antibodies are associated with the gamma globulins.

Various methods for the recovery of gamma globulin have been described heretofore. The gamma globulins are known to be concentrated in the Plasma Fraction II+III of Cohn et al., J. Clin. Invest. 23, 417–32 (1944); J. Amer. Chem. Soc. 68, 459–75 (1946). Commercially, gamma globulin, which is generally designated immune serum globulin, is prepared from Cohn Fraction II as a 16.5% intramuscular preparation. This fraction contains many of the protective antibodies present in the starting plasma. However, the presence of molecular aggregates of gamma globulin makes Cohn Fraction II material unsafe for intravenous use. Since the intravenous route of administration would permit larger, more comfortable doses, a preparation that is safe for intravenous administration would be desirable and have significant use.

Previous attempts to provide an immune serum globulin that is safe for intravenous use have utilized Cohn Fraction II-derived material. Using acid treatment, enzyme hydrolysis, cyanogen bromide cleavage, and other such procedures, investigators have attacked the Fc portion of the gamma globulin molecule to dissociate aggregates formed during fractionation and retard their subsequent formation. However, published findings on these procedures indicate that chemically modified gamma globulin preparations show various degrees of aggregation, reaggregation and fragmentation which make them less than desirable for clinical use.

Accordingly, it is an object of this invention to provide a method for the production of gamma globulin.

It is another object of this invention to provide an improved method for the preparation of a chemically unmodified gamma globulin concentrate which is suitable for intravenous administration.

It is a further object of this invention to provide a method for the recovery of unmodified, intravenous gamma globulin in both high yield and high purity.

Other objects and advantages of the present invention will be apparent to those skilled in the art upon reading the disclosure herein.

In accordance with this invention, an intravenous gamma globulin is prepared by the multiple fractionation of Cohn Plasma Fraction III with polyethylene glycol (PEG) having a molecular weight of from about 3,000 to 4,000, at a series of predetermined increasing concentrations and under selected pH condtions. In this method, a suspension of Cohn Plasma Fraction III paste in physiologically normal saline is adjusted to a pH of about 4.5 and admixed with polyethylene glycol to a concentration of 8% PEG. The resulting precipitate is separated from the supernatant and the supernatant is adjusted to a pH of about 5. The concentration of polyethylene glycol in the supernatant is then increased to 9% PEG and the resulting mixture is filtered. The filtrate is adjusted to a pH of about 7 and then admixed with polyethylene glycol to provide a final concentration of about 16% PEG. The resulting precipitate is retained as the chemically unmodified, high purity gamma globulin concentrate of this invention.

Although it has been known to employ polyethylene glycol polymers for the fractionation of blood plasma to yield gamma globulin concentrates, the procedures heretofore described have not produced material of the high yield and high purity as obtained in accordance with the present invention. Thus, Polson et al., Biochim. Biophys. Acta 82, 463–75 (1964) and U.S. Patent 3,415,804, describe the use of polyethylene glycol having a molecular weight of 6,000 for the production of gamma globulin. However, material made as described therein is suitable only for intramuscular or intraperitoneal injection and not for intravenous administration. Moreover, the yield obtained by following the procedure described by Polson is substantially less than obtained in accordance with the present invention. Furthermore, the Polson procedure undesirably requires the use of a final fractionation of the gamma globulin concentrate with ethanol. Such procedure is not required in accordance with the invention described and claimed herein.

The following examples will further illustrate the invention although the invention is not limited to these specific examples. In these examples, the Cohn Plasma Fraction III paste was obtained by Method 9 as described by Oncley et al., J. Amer. Chem. Soc. 71, 541–50 (1949) and Kirk-Othmer, Encyl. of Chem. Tech. 3, 589–92 (2d ed. 1964).

EXAMPLE 1

Cohn Plasma Fraction III paste (25 kilograms), stored at −25° C., is resuspended in freshly prepared physiologically normal (0.9 gram percent) saline (475 kilograms) and the temperature of the suspension raised to about 10 to 15° C. while mixing with a "Lightnin" mixer. The pH of the suspension is adjusted to 4.5 with N HCl. Polyethylene glycol 4,000 ("Carbowax" 4000) is added to a concentration 8% (8 grams of PEG/100 grams of suspension) and the suspension is mixed for two hours and then centrifuged. The resulting supernatant is adjusted to pH 5.0 with N NaOH. Additional PEG 4,000 is added to a concentration of 9% and the suspension is mixed for two hours and then filtered. The resulting filtrate is adjusted to pH 7.0 with N NaOH. PEG 4,000 is added to a concentration of 16% and the suspension is mixed for two hours and then centrifuged. The resulting precipitate is resuspended in 0.3 molar (22.5 grams per liter) glycine to a concentration of 3.5 gram percent total protein in the suspension. The suspension is then filtered. Solid NaCl (one gram percent) is dissolved in the solution, the suspension is filtered and the filtrate is then dispensed into sterile bottles for infusion.

The final bottled material was analyzed by immunoelectrophoresis and the protein content was judged to be 95% pure gamma globulin. This product is suitable for intravenous injection.

EXAMPLE 2

By way of comparison with Example 1, blood plasma was fractionated with polyethylene glycol 6,000 ("Carbowax" 6000) ammonium sulfate and ethanol in accordance with Example 7 in U.S. Pat. 3,415,804. This procedure was followed up to the step of adjusting the pH to 4.6, at column 8, lines 8 to 12. At this point, the gamma globulin is supposed to remain in the supernatant for further processing. However, in three separate trials, 50 to 70% of the gamma globulin was lost to the precipitate at this point. Both the average purity and average recovery is substantially less according to the patented procedure than according to the procedure described herein. The following table sets forth the results observed in said three trials in comparison with the results obtained in accordance with the above Example 1:

| Procedure | Percent | |
|---|---|---|
|  | Purity | Yield |
| Patent trial: | | |
| 1[1] | 86 | 7.4 |
| 2[1] | 91.5 | 17 |
| 3[1] | 95 | 9 |
| Example 1 herein | 95 | 60 |

[1] U.S. Patent 3,415,804, Example 7.

In another comparison, which employed the casein assay procedure of Sgouris et al. Vox. Sanguinis 5, 357–76 (1960), it was found that the PEG 6,000 described in the patent disclosure caused a greater amount of plasmin and plasminogen to be concentrated in the final gamma globulin fraction than caused by use of PEG 4,000. The damage produced by these enzymes has been demonstrated by the fragmentation seen in the immunoelectrophoretic patterns of the product.

In still another comparison, the procedure of said patent Example 7 was followed, except that polyethylene glycol 4,000 was used instead of polyethylene glycol 6,000. In this example, the yield was 50% less than obtained according to the procedure of Example 1, above.

It is seen from the above, that the method described herein has significant advantages over the procedures described heretofore in producing a gamma globulin concentrate of greater yield and greater purity.

Various other examples and modifications of the foregoing examples will be apparent to those skilled in the art after reading the foregoing specification without departing from the spirit and scope of the invention described herein. All such further examples and modifications are included within the scope of the invention as defined in the appended claims.

What is claimed is:

1. The method of preparing a gamma globulin concentrate in high yield and purity and suitable for intravenous administration comprising suspending Cohn Plasma Fraction III paste in physiologically normal saline, adjusting the pH to about 4.5, admixing with polyethylene glycol to a concentration of about 8%, separating the resulting precipitate and adjusting the remaining solution to a pH of about 5, admixing with polyethylene glycol to a concentration of about 9%, filtering and adjusting the filtrate to a pH of about 7, admixing with polyethylene glycol to a concentration of about 16% and collecting the resulting precipitate as the active gamma globulin concentrate, said polyethylene glycol having a molecular weight of from about 3,000 to about 4,000.

2. The method of claim 1 in which the active gamma globulin concentrate is suspended in a glycine-saline solution.

References Cited
UNITED STATES PATENTS 3,415,804    12/1968    Polson _____ 260—112

OTHER REFERENCES

J. Amer. Chem. Soc. 71, 541–50 (1949), Oncley et al.
Encyl. of Chem. Tech., 3, 576–579, 585–592, 1964, Kirk-Othmer.
Biochim. Biophys. Acta, 82, 463–475 (1964), Polson et al.

HOWARD E. SCHAIN, Primary Examiner

U.S. Cl. X.R.

424—177